(12) United States Patent
Koike et al.

(10) Patent No.: US 7,477,036 B2
(45) Date of Patent: Jan. 13, 2009

(54) MOTOR-DRIVEN POWER STEERING APPARATUS

(75) Inventors: Yohei Koike, Tochigi (JP); Takahiro Kasuga, Tochigi (JP)

(73) Assignee: Showa Corporation, Saitama (JP)

( * ) Notice: Subject to any disclaimer, the term of this patent is extended or adjusted under 35 U.S.C. 154(b) by 547 days.

(21) Appl. No.: 11/073,905

(22) Filed: Mar. 7, 2005

(65) Prior Publication Data

US 2006/0022619 A1 Feb. 2, 2006

(30) Foreign Application Priority Data

Jul. 29, 2004 (JP) ............................. 2004-222551

(51) Int. Cl.
*G05B 5/00* (2006.01)
(52) U.S. Cl. .................... 318/489; 318/52; 180/197; 180/207
(58) Field of Classification Search .................. 318/52, 318/489; 180/197, 207
See application file for complete search history.

(56) References Cited

U.S. PATENT DOCUMENTS

| 4,976,330 | A | * | 12/1990 | Matsumoto | 180/197 |
|---|---|---|---|---|---|
| 5,193,888 | A | * | 3/1993 | Okazaki et al. | 303/163 |
| 5,473,231 | A | * | 12/1995 | McLaughlin et al. | 318/433 |
| 5,636,121 | A | * | 6/1997 | Tsuyama et al. | 701/70 |
| 5,907,277 | A | * | 5/1999 | Tokunaga | 340/441 |
| 6,091,214 | A | * | 7/2000 | Yamawaki et al. | 318/52 |
| 6,107,761 | A | * | 8/2000 | Seto et al. | 318/139 |
| 6,405,113 | B1 | * | 6/2002 | Yamawaki et al. | 701/41 |
| 6,422,963 | B2 | * | 7/2002 | Kurose | 474/101 |
| 6,885,927 | B2 | * | 4/2005 | Arimura | 701/41 |

FOREIGN PATENT DOCUMENTS

JP 06206558 A * 7/1994 ............... 180/6.2

OTHER PUBLICATIONS

Japanese Patent Application Laid Open No. HEI 6-8839.

* cited by examiner

*Primary Examiner*—Walter Benson
*Assistant Examiner*—Antony M Paul
(74) *Attorney, Agent, or Firm*—Orum & Roth LLC

(57) ABSTRACT

In a motor-driven power steering apparatus for converting rotation of an electric motor into a linear stroke of a rack shaft by an interposition of a power transmission mechanism and steering a tire wheel connected to the rack shaft, there is provided a motor slip detecting means for previously determining a cumulative rotational speed of the electric motor corresponding to a maximum stroke displacement amount of the rack shaft, integrating the rotational speed of the electric motor, and estimating that slip or idle running is generated in a rotational force transmission system from the electric motor to the rack shaft, where the integral rotational speed of the electric motor becomes more than a prescribed cumulative rotational speed.

16 Claims, 4 Drawing Sheets

MOTOR-DRIVEN POWER STEERING APPARATUS

BACKGROUND OF THE INVENTION

1. Field of the Invention

The present invention relates to a motor-driven power steering apparatus.

2. Description of the Related Art

A motor-driven power steering apparatus may include a system which detects steering torque of a steering system by a steering torque sensor, and sets a target current on the basis of the detected steering torque. The system may control driving of an electric motor on the basis of a pulse width modulation (PWM) signal obtained by applying a proportional integral (PI) compensation to a deviation between the target current and a current actually flowing through the electric motor so as to execute a linear stroke of a rack shaft, and may apply a steering assist force to a tire wheel connected to the rack shaft, as described in Japanese Patent Application Laid-open No. 6-8839 (patent document 1).

In the conventional motor-driven power steering apparatus, even if slip is generated in a rotational force transmission system extending from the electric motor to the rack shaft, it is impossible to achieve early detection of the slip generation, and there is a risk that the steering assist control becomes unstable. With slip generated in the rotational force transmission system of the electric motor, there may be breakage of a belt transmission mechanism for converting the rotation of the electric motor into the linear stroke of the rack shaft and a ball screw apparatus, or an irregular slip caused by slack in a fastening connection portion of the transmission mechanism.

SUMMARY OF THE INVENTION

An object of the present invention is to achieve early detection of slip generation in a rotational force transmission system from an electric motor to a rack shaft, in a motor-driven power steering apparatus.

In accordance with the present invention, there is provided a motor-driven power steering apparatus for converting rotation of an electric motor into a linear stroke of a rack shaft by a power transmission mechanism, and steering a tire wheel connected to the rack shaft.

The apparatus has a motor slip detecting means for previously determining a cumulative rotational speed of the electric motor corresponding to a maximum stroke displacement amount of the rack shaft, integrating the detected rotational speed of the electric motor, and estimating that slip is generated in a rotational force transmission system from the electric motor to the rack shaft, where the integral rotational speed of the electric motor exceeds a prescribed cumulative rotational speed.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings.

DESCRIPTION OF THE PREFERRED EMBODIMENTS

Figure 1:
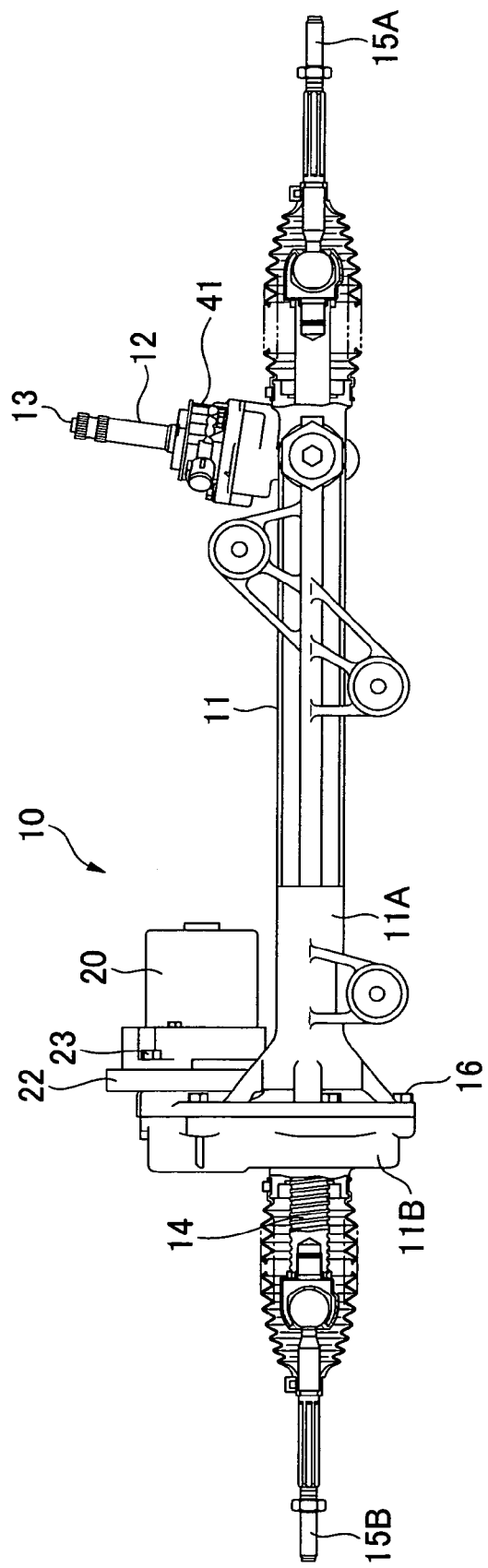
FIG. 1 is a front elevational view showing a motor-driven power steering apparatus.

A motor-driven power steering apparatus 10 is structured, as shown in FIG. 1, such that a gear housing 11 is separated into a first gear housing 11A and a second gear housing 11B. A steering input shaft 12 is supported to the gear housing 11 (the first gear housing 11A). An output shaft (not shown) is connected to the input shaft 12 via a torsion bar 13. A pinion (not shown) is provided in the output shaft, and a rack shaft 14 engaging with the pinion is supported to the gear housing 11 so as to freely move linearly in a lateral direction. A steering torque sensor 41 is provided between the input shaft 12 and the output shaft. The steering torque sensor detects a steering torque on the basis of a relative rotational displacement amount generated between the input shaft 12 and the output shaft due to an elastic torsional deformation of the torsion bar caused by a steering torque applied to a steering wheel, and outputs a steering torque signal Ts.

The motor-driven power steering apparatus 10 is structured such that both end portions of the rack shaft 14 protrude to both sides of the gear housing 11 (the first gear housing 11A and the second gear housing 11B). Tie rods 15A and 15B are connected to end portions thereof, and left and right tire wheels can be steered via the tie rods 15A and 15B with respect to linear movement of the rack shaft 14.

Figure 2:
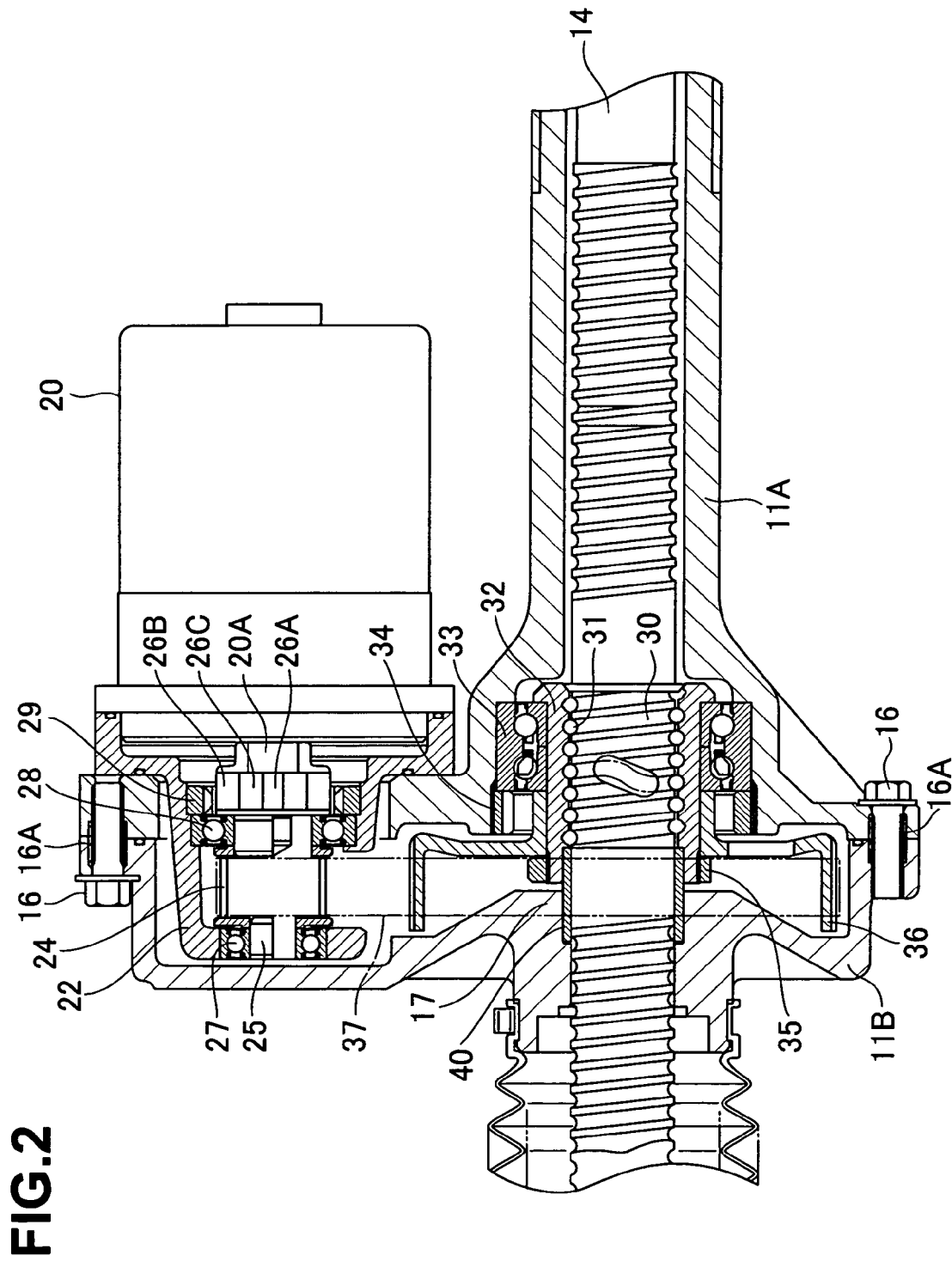
FIG. 2 is a cross sectional view showing a main portion of the motor-driven power steering apparatus.

The motor-driven power steering apparatus 10 is structured, as shown in FIG. 2, such that an electric motor 20 is fixed to a holder 22 by a mounting bolt 21 (not shown), and the holder 22 can be attached to and detached from the first gear housing 11A by a mounting bolt 23. The holder 22 attached to the first gear housing 11A and inserted to an inner portion of the first gear housing 11A has a fixed gap with respect to inner peripheries of the gear housings 11A and 11B. The holder 22 is allowed to swing with respect to the first gear housing 11A, and can adjust the tensile force of a belt 37 wound around a drive pulley 24 and a driven pulley 36 which are supported to the holder 22 in such a manner as mentioned below.

The holder 22 supports a center shaft 25 of the drive pulley 24, and engages and attaches a joint 26A in a shaft end of a rotating shaft 20A of the electric motor 20 and a joint 26B in a shaft end of the center shaft 25 with each other from an axial direction, pinching an intermediate joint 26C such as a rubber element or the like between teeth provided at a plurality of positions in a peripheral direction. In the drive pulley 24, both end portions of the center shaft 25 are supported at both ends to the holder 22 by bearings 27 and 28. Reference numeral 29 denotes a retaining ring for fixing an outer ring of the bearing 28.

The motor-driven power steering apparatus 10 is provided with a ball screw 30 in the rack shaft 14, has a ball nut 32 which is engaged with the ball screw 30 via a ball 31, and rotatably supports the ball nut 32 by a bearing 33 supported to the gear housing 11 (the first gear housing 11A). Reference numeral 34 denotes an outer ring fixing nut of the bearing 33. The driven pulley 36 is fixed to an outer periphery of the ball nut 32 by a lock nut 35.

The motor-driven power steering apparatus 10 is structured such that the belt 37 is wound around the drive pulley 24 in a side of the electric motor 20 and the driven pulley 36 in a side of the ball nut 32. The rotation of the electric motor 20 is transmitted to the ball nut 32 via the drive pulley 24, the belt 37 and the driven pulley 36, and is converted into the linear stroke of the rack shaft 14, thereby linearly moving the rack shaft 14. Accordingly, the electric motor 20 is structured such as to apply steering assist force to the steering system.

The motor-driven power steering apparatus 10 is structured such that the rack shaft 14 supported to the first gear housing 11A is inserted to the second gear housing 11B, the holder 22 attached to the first gear housing 11A is covered by the second gear housing 11B, and the first gear housing 11A and the second gear housing 11B are fastened by a plurality of coupling bolts 16. The first gear housing 11A and the second gear housing 11B are positioned by a plurality of tubular knock pins 16A, by striking both end portions of the knock pins 16A thereinto, thereafter being screwed and fastened by the coupling bolt 16 inserted to each of the knock pins 16A, as shown in FIG. 2. One of the coupling bolts 16 is screwed into the first gear housing 11A through the knock pin 16A, and the other of the coupling bolts 16 is screwed into the second gear housing 11B through the knock pin 16A.

The motor-driven power steering apparatus 10 has the following structure for the purpose of making an oscillation of the rack shaft 14 supported to the gear housings 11A and 11B.

In the second gear housing 11B, a portion opposing the ball nut 32 supported to the first gear housing 11A is formed as a bush support portion 17, and a bush 40 is bridged between the ball nut 32 and the bush support portion 17. The bush 40 is pressure inserted to a leading end side inner peripheral portion of the ball nut 32 so as to be provided in a fixed manner, and supports the rack shaft 14 so as to be linearly slidable, and slidably supported to the inner peripheral portion of the bush support portion 17.

The bush 40 is structured such that a part in an axial direction of an outer periphery of a tube body made of a metal or the like is formed as a slide portion with the bush 17, and an entire portion of the inner periphery is formed as a slide portion with the rack shaft 14. The slide portion is provided by depositing a lubricating coating layer such as an oil-contaminated polyacetal resin, a tetrafluoroethylene resin or the like to a surface of the tube body.

Figure 3:
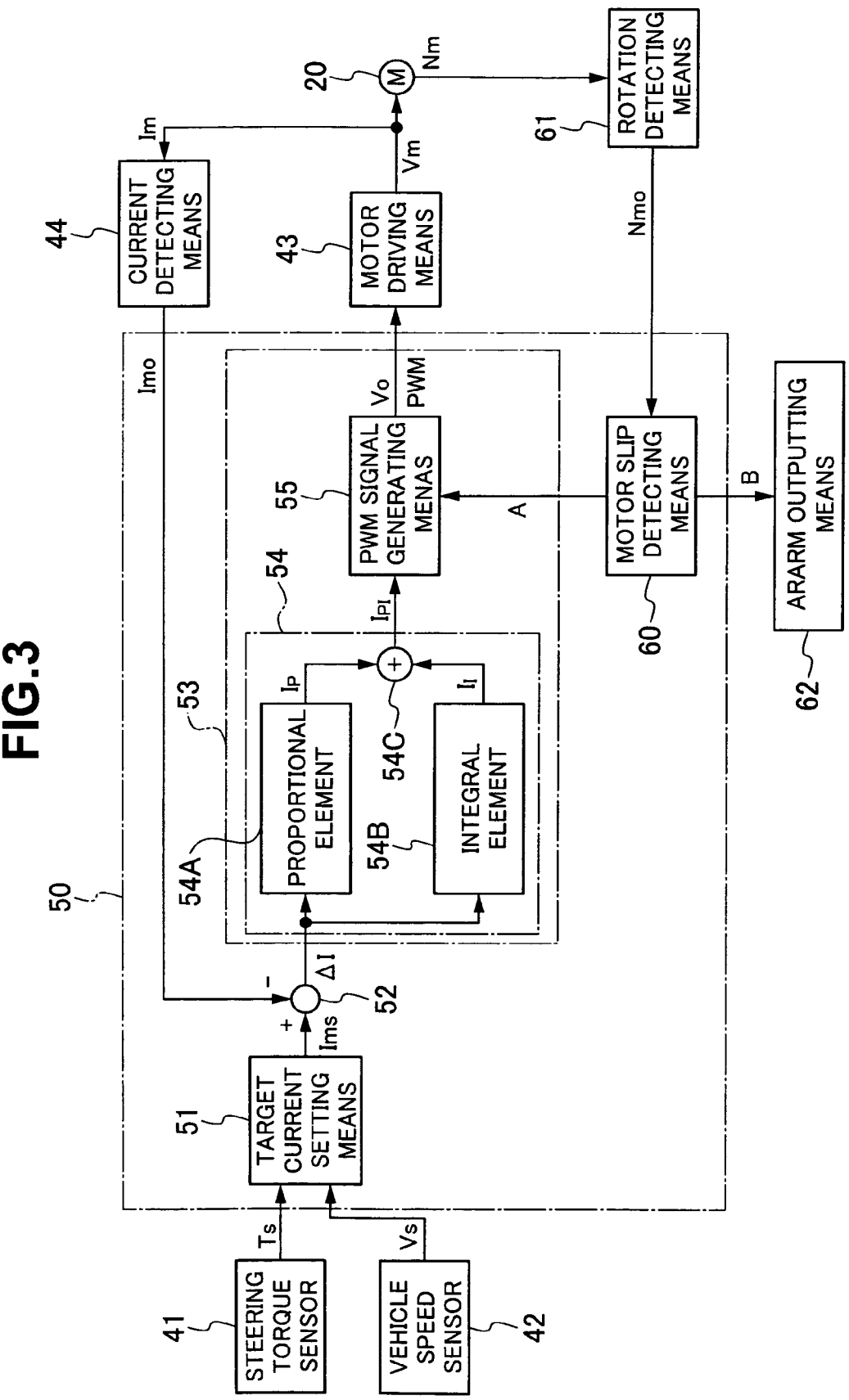
FIG. 3 is a block diagram showing a control system of the motor-driven power steering apparatus.

The motor-driven power steering apparatus 10 has the following control means 50 for the electric motor 20 (FIG. 3).

The control means 50 is additionally provided with a steering torque sensor 41 and a vehicle speed sensor 42. The steering torque sensor 41 detects the steering torque of the steering system and outputs the steering torque signal Ts to the control means 50, as mentioned above. The vehicle speed sensor 42 detects the speed of the vehicle and outputs a vehicle speed signal Vs to the control means 50.

The control means 50 has various arithmetic processing means, signal generating means, memories and the like, in connection with a microprocessor, and generates a drive control signal VO (PWM signal) to which P(a proportional control) and I (an integral control) are applied on the basis of the steering torque signal Ts and the vehicle speed signal Vs, thereby controlling the motor driving means 43.

The motor driving means 43 is structured by a bridge circuit having a switching element, for example, four power field effect transistors (FET), insulated gate bipolar transistors (IGBT) or the like. A motor voltage Vm is output on the basis of the drive control signal V0, which drives the electric motor 20. When the steering wheel is steered in a clockwise direction, the electric motor 20 is, for example, positively rotated so as to apply the steering assist force to the steering system in such a manner that a front wheel is directed in a clockwise direction.

The control means 50 is additionally provided with a current detecting means 44. The current detecting means 44 detects a motor current Im actually flowing through the electric motor 20, and feeds back or negatively feeds back a detected current signal Imo converted into a digital signal corresponding to the motor current Im to the control means 50.

The control means 50 has a target current setting means 51, a deviation arithmetic processing means 52 and a current control arithmetic processing means 53.

The target current setting means 51 is provided with a memory such as a read only memory (ROM) or the like. A target current signal Ims is read with respect to a steering torque signal Ts obtained by setting the vehicle speed signal Vs to a parameter, from the steering torque signal Ts output by the steering torque sensor 41 and a target current signal Ims map previously stored in the memory on the basis of the steering torque signal Ts and the vehicle speed signal Vs output by the vehicle speed sensor 42. The target current signal Ims is output toward the deviation arithmetic processing means 52.

The deviation arithmetic processing means 52 arithmetically processes a deviation (Ims-Imo) between the target current signal Ims and the detected current signal Imo, and outputs the deviation signal $\Delta I$ to the current control arithmetic processing means 53.

The current control arithmetic processing means 53 applies a PWM signal Vo corresponding to a direction, such as a rotational direction of the electric motor 20, polarizing signal and a duty ratio to the motor driving means 43 of the electric motor 20, in correspondence to the deviation signal $\Delta I$ between the target current signal Ims and the detected current signal Imo.

The current control arithmetic processing means 53 has a PI (proportion and integral) control means 54 and a PWM signal generating means 55.

The PI control means 54 is provided with a proportional element 54A generating a proportional sensitivity KP so as to execute a proportional control, an integral element 54B generating an integral gain KI so as to execute an integral control, and an adder 54C adding output signals of the proportional element 54A and the integral element 54B. The proportional element 54A and the integral element 54B are connected in parallel. The proportional element 54A outputs a proportional signal IP obtained by multiplying the deviation signal $\Delta I$ by the proportional sensitivity KP. The integral element 54B outputs an integral signal II obtained by applying an integral process having the integral gain KI to the deviation signal $\Delta I$, respectively to the adder 54C. The adder 54C adds the proportional signal IP and the integral signal II, and outputs a proportional integral signal IPI (IP+II) toward the PWM signal generating means 55.

The PWM signal generating means 55 outputs a directional polar signal corresponding to a direction and a magnitude of the proportional integral signal IPI and a PWM signal corresponding to the duty ratio as a drive control signal Vo toward the motor drive means 43. The motor drive means 43 drives the electric motor 20 on the basis of a motor drive voltage Vm.

Accordingly, the control means 50 operates the motor-driven power steering apparatus 10 in the following manner.

(1) When the steering torque detected by the steering torque sensor 41 is lower than a predetermined value, no steering assist force is required, and the electric motor 20 is not driven.

(2) When the steering torque detected by the steering torque sensor 41 is more than a predetermined value, steering assist force is required. Accordingly, the electric motor 20 is driven. The rotational force of the electric motor 20 is transmitted to the ball nut 32 via the drive pulley 24, the belt 37 and the driven pulley 36, and forms the steering assist force for executing the linear stroke of the rack shaft 14 via the ball screw 30.

The motor-driven power steering apparatus 10 is provided with a motor slip detecting means 60 in the control means 50 for detecting slip generation in the rotational force transmission system of transmitting the rotational force from the electric motor 20 to the rack shaft 14, and is additionally provided with a rotation detecting means 61 of the electric motor 20 and an alarm outputting means 62 in the motor slip detecting means 60.

Slip of the electric motor 20 may be is caused by slip between any connection portions in the rotational force transmission system from the electric motor 20 to the rack shaft 14, or an idle running due to the engagement breakage. Examples include a breakage and slip in the coupling joint (26A to 26C) between the electric motor 20 and the center shaft 25 of the drive pulley 24, slip of the fitting portion between the drive pulley 24 and the center shaft 25, disconnection and slip of the belt 37, slip in the coupling portion between the ball nut 32 and the driven pulley 36, breakage of the ball screw 30, or the like.

Figure 4:
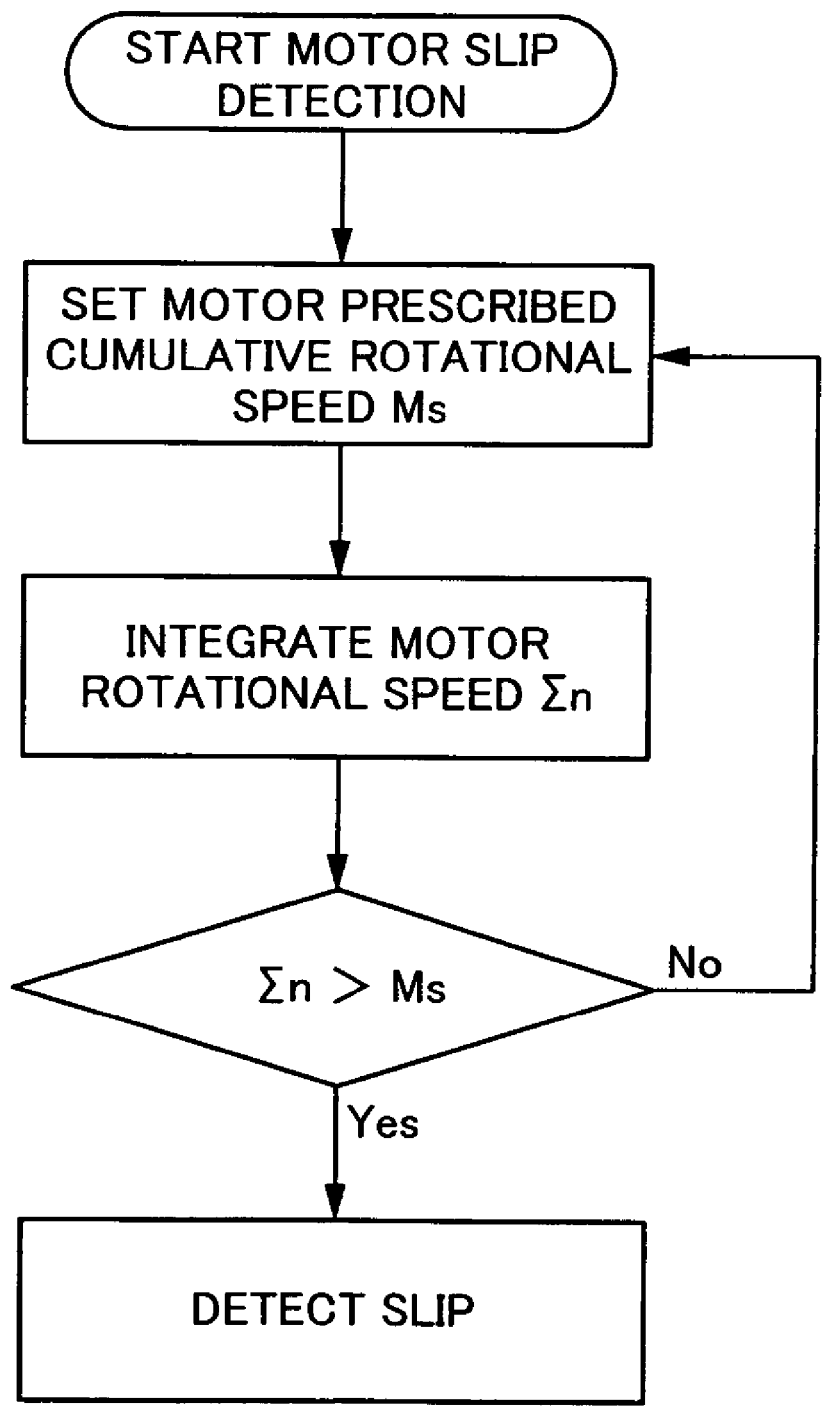
FIG. 4 is a flow chart showing a motor slip detecting procedure.

The motor slip detecting means 60 detects the slip generation in the rotational force transmission system from the electric motor 20 to the rack shaft 14, in the following manner (FIG. 4).

(1) A prescribed cumulative rotational speed Ms of the electric motor 20 is previously set and may be measured or calculated, in correspondence to a maximum stroke displacement amount Rmax of the rack shaft 14.

Between the cumulative rotational speed of the positive rotation or the reverse rotation of the electric motor 20 and a converting stroke displacement amount of the rack shaft 14 corresponding thereto, the converting stroke displacement amount of the rack shaft 14 corresponding to the cumulative rotational speed is obtained by multiplying the cumulative rotational speed of the electric motor 20 by a linear stroke converting constant by the power transmission mechanism of the rack shaft 14. This may involve consideration of a stroke change length of the rack shaft 14 per one rotation of the electric motor 20, a speed reduction ratio of a power transmission path from the electric motor 20 to the ball nut 32, and a multiplication value of a lead of the ball screw 30. In other words, the rotational speed of the motor integrated in a leftward steering direction or a rightward steering direction forms the converting stroke displacement amount of the rack shaft 14. Accordingly, the prescribed cumulative rotational speed Ms of the electric motor 20 corresponding to the maximum stroke Rmax of the rack shaft 14 can be previously easily calculated on the basis of the relation.

(2) Rotational speed $\Sigma n$ of the electric motor 20 is integrated.

The rotation detecting means 61 detects a rotational speed Nm of the electric motor 20, and outputs a detected rotational speed signal Nmo to the motor slip detecting means 60. The motor slip detecting means 60 sets the rotational speed during positive rotation of the electric motor 20 to a positive rotational speed, and the rotational speed during reverse rotation to a negative rotational speed, on the basis of the detected rotational speed signal Nmo, and integrates the rotational speed of the electric motor 20, thereby obtaining the integral rotational speed $\Sigma n$. For example, the positive integral rotational speed En corresponds to the leftward steering amount cumulated in the leftward steering direction, and the negative integral rotational speed $\Sigma n$ corresponds to the rightward steering amount cumulated in the rightward steering direction.

(3) In the case that the integral rotational speed $\Sigma n$ becomes more than the prescribed cumulative rotational speed Ms by comparing the integral rotational speed $\Sigma n$ of the electric motor 20 in the item (2) mentioned above with the prescribed cumulative rotational speed Ms of the electric motor 20 mentioned above (1), it is determined that any slip or idle running is generated in the rotational force transmission system from the electric motor 20.

When the motor slip detecting means 60 detects the slip or idle running generation in the rotational force transmission system from the electric motor 20, the motor slip detecting means 60 outputs a motor stop control signal A to the PWM signal generating means 55 so as to control the PWM signal generating means 55, and sets a duty ratio D of the PWM signal V0 output by the PWM signal generating means 55 to zero. Accordingly, it is possible to stop control the unnecessary driving of the electric motor 20. Further, in a slip initial state of the rotational force transmission system, there may be circumstances where an irregular slip detection is executed. In this case, it is possible to determine that any complete slip is not yet generated in the transmission system and the engagement state is in an unstable coupling state, and it is possible to gradually reduce the duty ratio D of the PWM signal V0 output by the PWM signal generating means 55 to zero.

When the motor slip detecting means 60 detects the slip generation in the rotational force transmission system from the electric motor 20, the motor slip detecting means 60 outputs an alarm output signal B to the alarm outputting means 62 so as to control the alarm outputting means 62, thereby outputting an alarm on the basis of a visual signal, an acoustic signal and the like to the user.

In accordance with the present embodiment, the following operations and effects can be achieved.

(a) The condition that the integral rotational speed $\Sigma n$ in the leftward steering direction or the rightward steering direction of the electric motor 20 arithmetically processed by the motor slip detecting means 60 exceeds the prescribed cumulative rotational speed Ms means that the converting stroke displacement amount of the rack shaft 14 corresponding to the integral rotational speed $\Sigma n$ is more than the prescribed maximum stroke Rmax in the leftward steering direction or the rightward steering direction, and that at least a part of the rotation from the electric motor 20 is not actually transmitted to the rack shaft 14. Accordingly, it is possible to estimate that the electric motor 20 is in the slip or idle rotating state, and it is possible to easily detect the slip or idle running generation of the rotational force transmission system from the electric motor 20 to the rack shaft 14 at an early stage.

(b) When the motor slip detecting means 60 detects the slip generation of the rotational force transmission system from the electric motor 20, it is possible to immediately cancel the steering assist control of the unstable state by stop controlling the electric motor 20.

(c) When the motor slip detecting means 60 detects the slip generation in the rotational force transmission system of the electric motor 20, the alarm outputting means 62 outputs the alarm, and can immediately inform the user of an abnormality of the steering assist control.

(d) When the power transmission mechanism from the electric motor 20 to the rack shaft 14 is constituted by the belt 37 wound around the drive pulley 24 and the driven pulley 36, it is possible to detect slip mentioned in the item (a) caused by breakage slack, or the like of the belt 37.

(e) When the power transmission mechanism from the electric motor 20 to the rack shaft 14 comprises a gear train of the drive gear and the driven gear, it is possible to detect the slip mentioned in the item (a) caused by breakage or the like of the gear teeth.

As mentioned above, in accordance with the present invention, between the cumulative rotational speed of the positive rotation or the reverse rotation of the electric motor and the converting stroke displacement amount of the rack shaft corresponding thereto, there is a relation such that the value obtained by multiplying the cumulative rotational speed of the electric motor by the linear stroke converting constant by the power transmission mechanism running into the rack shaft, the stroke length of the rack shaft at a time when the electric motor rotates at one time, becomes the converting stroke displacement amount of the rack shaft corresponding to the cumulative rotational speed. In other words, the converting stroke displacement amount of the rack shaft being cumulated in the leftward steering direction or the rightward steering direction. Accordingly, it is possible to previously convert and determine the cumulative rotational speed of the electric motor corresponding to the maximum stroke displacement amount of the rack shaft, on the basis of the relation.

Further, in the case that the rotational speed at a time of the positive rotation of the electric motor is set to the positive rotational speed, the rotational speed at a time of the reverse rotation is set to the negative rotational speed, and the rotational speed of the electric motor is integrated. The positive integral rotational speed corresponds, for example, to the leftward steering amount cumulated in the leftward steering direction, and the negative cumulative rotational speed corresponds to the rightward steering amount cumulated in the rightward steering direction.

In the case that the cumulative rotational speed in the leftward steering direction or the rightward steering direction of the electric motor becomes more than the prescribed cumulative rotational speed, the converted stroke displacement amount of the rack shaft corresponding to the cumulative rotational speed becomes more than the prescribed maximum stroke displacement amount in the leftward steering direction or the rightward steering direction. It is thereby possible to determine that at least a part of the rotation of the electric motor is not properly transmitted in driving to the rack shaft, it is possible to estimate that a portion in the drive transmission system from the electric motor to the rack shaft is in the idle running or slip state, and it is possible to easily detect the slip generation in the rotational force transmission system from the electric motor to the rack shaft at an early stage.

As heretofore explained, embodiments of the present invention have been described in detail with reference to the drawings. However, the specific configurations of the present invention are not limited to the illustrated embodiments but those having a modification of the design within the range of the presently claimed invention are also included in the present invention. For example, the power transmission mechanism for transmitting the rotation of the electric motor to the rack shaft may be constituted by a pinion assist drive mechanism in which the rotational force of the drive gear fixed to the rotating shaft of the electric motor is engaged with the driven gear fixed to the pinion shaft.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be encompassed within a scope of equivalents thereof with respect to the features set out in the appended claims.

What is claimed is:

1. A motor-driven power steering apparatus, comprising:
   a motor slip detecting structure for determining a cumulative rotational speed of an electric motor corresponding to a maximum stroke displacement amount of the rack shaft, integrating the detected rotational speed of the electric motor, and estimating that undesirable slip is generated in a rotational force transmission system between the electric motor to the rack shaft, in the event that all the force generated by the electric motor is not transferred to the rack shaft, where the integral rotational speed of the electric motor becomes more than a prescribed cumulative rotational speed, wherein rotation of the electric motor is converted into a linear stroke of a rack shaft by a power transmission mechanism for steering a tire wheel connected to the rack shaft.

2. A motor-driven power steering apparatus as claimed in claim 1, further comprising a control structure for stop controlling the electric motor where the motor slip detecting means detects the slip generation in the rotational force transmission system of the electric motor.

3. A motor-driven power steering apparatus as claimed in claim 1, further comprising an alarm outputting means for outputting an alarm where the motor slip detecting means detects the slip generation in the rotational force transmission system of the electric motor.

4. A motor-driven power steering apparatus as claimed in claim 2, further comprising an alarm outputting means for outputting an alarm where the motor slip detecting means detects the slip generation in the rotational force transmission system of the electric motor.

5. A motor-driven power steering apparatus as claimed in claim 1, wherein rotational force of a drive pulley fixed to a rotating shaft of the electric motor is coupled in driving to the rack shaft via a power transmission mechanism including a driven pulley connected to the drive pulley by a wound body.

6. A motor-driven power steering apparatus as claimed in claim 2, wherein rotational force of a drive pulley fixed to a rotating shaft of the electric motor is coupled in driving to the rack shaft via a power transmission mechanism including a driven pulley connected to the drive pulley by a wound body.

7. A motor-driven power steering apparatus as claimed in claim 3, wherein rotational force of a drive pulley fixed to a rotating shaft of the electric motor is coupled in driving to the rack shaft via a power transmission mechanism including a driven pulley connected to the drive pulley by a wound body.

8. A motor-driven power steering apparatus as claimed in claim 4, wherein rotational force of a drive pulley fixed to a rotating shaft of the electric motor is coupled in driving to the rack shaft via a power transmission mechanism including a driven pulley connected to the drive pulley by a wound body.

9. A motor-driven power steering apparatus as claimed in claim 1, wherein rotational force of a drive gear fixed to a rotating shaft of the electric motor is coupled in driving to the rack shaft via a power transmission mechanism including a driven gear engaged with the drive gear.

10. A motor-driven power steering apparatus as claimed in claim 2, wherein rotational force of a drive gear fixed to a rotating shaft of the electric motor is coupled in driving to the rack shaft via a power transmission mechanism including a driven gear engaged with the drive gear.

11. A motor-driven power steering apparatus as claimed in claim 3, wherein rotational force of a drive gear fixed to a rotating shaft of the electric motor is coupled in driving to the rack shaft via a power transmission mechanism including a driven gear engaged with the drive gear.

12. A motor-driven power steering apparatus as claimed in claim 4, wherein rotational force of a drive gear fixed to a rotating shaft of the electric motor is coupled in driving to the rack shaft via a power transmission mechanism including a driven gear engaged with the drive gear.

13. A motor-driven power steering apparatus as claimed in claim 5, wherein rotational force of a drive gear fixed to a rotating shaft of the electric motor is coupled in driving to the rack shaft via a power transmission mechanism including a driven gear engaged with the drive gear.

14. A motor-driven power steering apparatus as claimed in claim 6, wherein rotational force of a drive gear fixed to a rotating shaft of the electric motor is coupled in driving to the rack shaft via a power transmission mechanism including a driven gear engaged with the drive gear.

15. A motor-driven power steering apparatus as claimed in claim 7, wherein rotational force of a drive gear fixed to a rotating shaft of the electric motor is coupled in driving to the rack shaft via a power transmission mechanism including a driven gear engaged with the drive gear.

16. A motor-driven power steering apparatus as claimed in claim 8, wherein rotational force of a drive gear fixed to a rotating shaft of the electric motor is coupled in driving to the rack shaft via a power transmission mechanism including a driven gear engaged with the drive gear.

\* \* \* \* \*